(12) United States Patent
Do et al.

(10) Patent No.: US 8,727,629 B2
(45) Date of Patent: May 20, 2014

(54) SERIES BEARING SUPPORT APPARATUS FOR A GAS TURBINE ENGINE

(75) Inventors: Kevin Michael Do, West Chester, OH (US); Benjamin Johannes Seppala, Cincinnati, OH (US); David Garry Kerry, West Chester, OH (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 13/286,792

(22) Filed: Nov. 1, 2011

(65) Prior Publication Data

US 2013/0108440 A1 May 2, 2013

(51) Int. Cl.
*F16C 19/49* (2006.01)
*F01D 25/16* (2006.01)
*F16C 27/00* (2006.01)

(52) U.S. Cl.
USPC ............. 384/494; 384/99; 384/535; 384/548; 384/608; 384/903; 415/229; 415/170.1

(58) Field of Classification Search
USPC ........... 384/99, 494, 504, 507, 548, 563, 565, 384/597, 613, 618–618, 535, 609, 903; 415/129, 229, 179, 170.1; 417/407
See application file for complete search history.

(56) References Cited

U.S. PATENT DOCUMENTS

| | | | | |
|---|---|---|---|---|
| 3,133,693 A | * | 5/1964 | Holl | 184/6.11 |
| 3,325,088 A | * | 6/1967 | Seneschall et al. | 415/69 |
| 3,536,369 A | * | 10/1970 | Ainsworth et al. | 384/494 |
| 3,703,081 A | * | 11/1972 | Krebs et al. | 60/226.1 |
| 3,901,557 A | | 8/1975 | Daniels | |
| 4,186,975 A | * | 2/1980 | Schwarz et al. | 384/465 |
| 4,304,522 A | | 12/1981 | Newland | |
| 4,652,219 A | * | 3/1987 | McEachern et al. | 384/518 |
| 4,676,667 A | * | 6/1987 | Komatsu et al. | 384/536 |
| 4,981,415 A | | 1/1991 | Marmol et al. | |
| 5,201,844 A | * | 4/1993 | Greenwood et al. | 415/122.1 |
| 5,619,850 A | * | 4/1997 | Palmer et al. | 60/772 |
| 6,443,698 B1 | | 9/2002 | Corattiyil et al. | |
| 6,540,483 B2 | | 4/2003 | Allmon et al. | |
| 6,846,158 B2 | * | 1/2005 | Hull | 384/99 |
| 2006/0153483 A1 | * | 7/2006 | Bridges et al. | 384/475 |
| 2007/0104403 A1 | * | 5/2007 | Kawamura et al. | 384/516 |
| 2008/0063333 A1 | * | 3/2008 | Bruno et al. | 384/494 |
| 2010/0027930 A1 | | 2/2010 | Kinnaird et al. | |
| 2012/0213629 A1 | * | 8/2012 | Rouesne | 415/170.1 |

FOREIGN PATENT DOCUMENTS

| | | |
|---|---|---|
| EP | 1 396 611 A2 | 3/2004 |
| FR | 2 951 232 A1 | 4/2011 |
| GB | 2 326 679 A | 12/1998 |

OTHER PUBLICATIONS

International Search Report issued in connection with WO Application No. PCT/US2012/062781, Feb. 14, 2013.

* cited by examiner

*Primary Examiner* — Marcus Charles
(74) *Attorney, Agent, or Firm* — William Scott Andes; Trego, Hines & Ladenheim, PLLC

(57) ABSTRACT

A bearing support apparatus for a gas turbine engine, including: a first annular member; a second annular member disposed within the first annular member; first and second axially spaced-apart rolling-element bearings disposed between the first and second annular members so as to enable relative rotation of the first and second members; a first spring element mounting the first bearing to the first member; and a second spring element mounting the second bearing to the first member through the first spring element, such that the first and second bearings are physically supported in series relative to the first member.

20 Claims, 6 Drawing Sheets

US 8,727,629 B2

SERIES BEARING SUPPORT APPARATUS FOR A GAS TURBINE ENGINE

BACKGROUND OF THE INVENTION

This invention relates generally to rolling element bearings and more particularly to the mounting of such bearings in gas turbine engines.

A gas turbine engine includes one or more shafts which are mounted for rotation in several bearings, usually of the rolling-element type. The bearings are enclosed in enclosures called "sumps" which are pressurized and provided with an oil flow for lubrication and cooling. The bearings in a gas turbine engine are usually a combination of roller and ball bearings. The roller bearings react radial loads of the shafts and the ball bearings react radial and thrust loads. Commonly the bearings are mounted in pairs, with a ball and a roller bearing at axially adjacent positions in a single bearing sump.

The ball bearings are typically the least reliable bearings in an engine. Ball bearings are more susceptible for failure when subjected to a combination of axial and radial load, while roller bearings that are under-loaded in the radial direction often fail by roller skidding damage. Increased radial load on the roller bearings increases cage speed, which decreases the risk of such damage. Accordingly, such bearing configurations require isolation of loads, with thrust loads being directed to the ball bearings and radial loads being directed to the roller bearings as much as possible. Prior art bearing support designs only isolate the majority of radial load.

Some existing engines have addressed the load isolation problem by incorporating "parallel" spring finger housings to support adjacent ball and damper roller bearings. This design is not completely effective at isolating the radial load from the ball bearings, with typically 10-30% of the applied radial load being transmitted through the ball bearings.

Other known existing engines address load isolation by including a ball bearing spring finger in "parallel" with a preloaded uncentered damper roller bearing. This design is effective at load isolation but is complex to manufacture and operate.

Accordingly, there is a need for a bearing support for a ball-and-roller bearing combination which isolates radial and thrust loads to the appropriate bearing and which is mechanically simple.

BRIEF SUMMARY OF THE INVENTION

This need is addressed by the present invention, which provides a bearing support apparatus in which a ball and roller bearing are mounted in series by spring elements, so as to isolate radial loads from the ball bearing.

According to one aspect of the invention, a bearing support apparatus for a gas turbine engine includes: a first annular member; a second annular member disposed within the first annular member; first and second axially spaced-apart rolling-element bearings disposed between the first and second annular members so as to enable relative rotation of the first and second members; a first spring element mounting the first bearing to the first member; and a second spring element mounting the second bearing to the first member through the first spring element, such that the first and second bearings are physically supported in series relative to the first member.

According to another aspect of the invention, a bearing apparatus for a gas turbine engine includes: a stationary, annular frame; a first bearing cage comprising annular forward and aft rings interconnected by an annular array of axially-extending first spring fingers, wherein the forward ring is mounted to the frame; a second bearing cage comprising annular forward and aft rings interconnected by an annular array of axially-extending second spring fingers, the aft ring mounted to the aft ring of the first bearing cage; a roller bearing carried by the aft ring of the second bearing cage; a ball bearing carried by the forward ring of the second bearing cage; and a shaft mounted in the roller and ball bearings.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
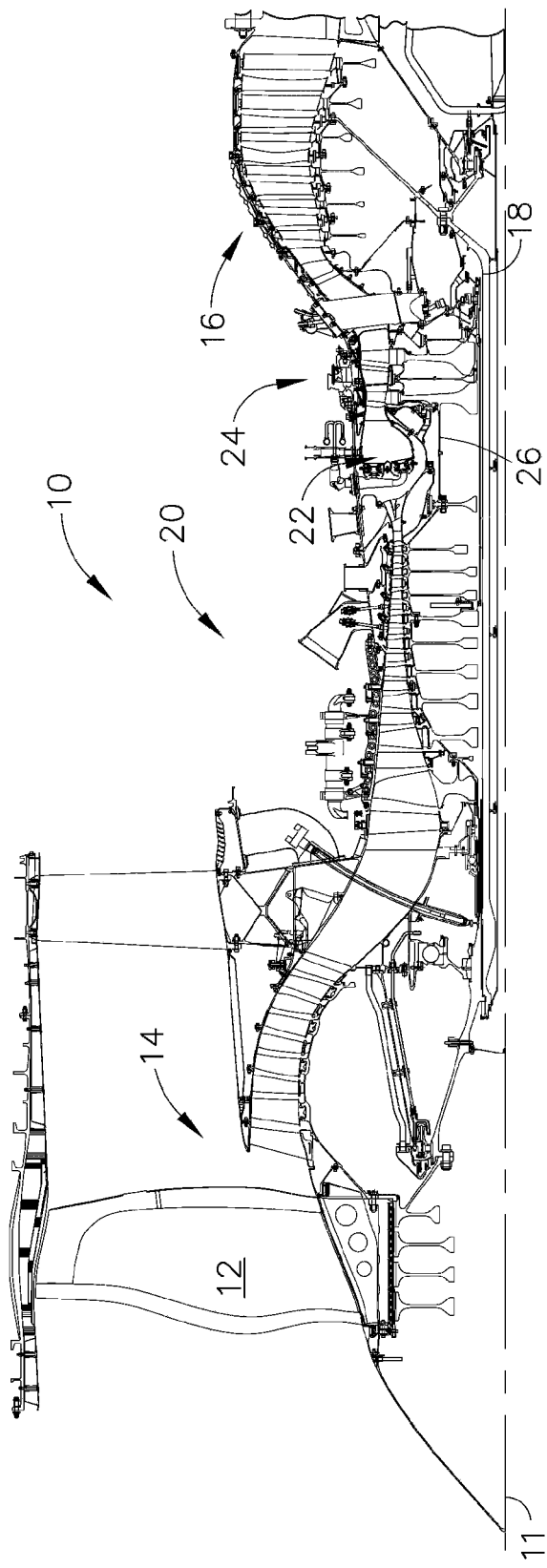
FIG. 1 is a half-sectional view of a gas turbine engine incorporating a bearing support apparatus constructed according to an aspect of the present invention.

Referring to the drawings wherein identical reference numerals denote the same elements throughout the various views, FIG. 1 depicts a gas turbine engine 10. The engine 10 has a longitudinal axis 11 and includes a fan 12, a low pressure compressor or "booster" 14 and a low pressure turbine ("LPT") 16 collectively referred to as a "low pressure system". The LPT 16 drives the fan 12 and booster 14 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

Figure 2:
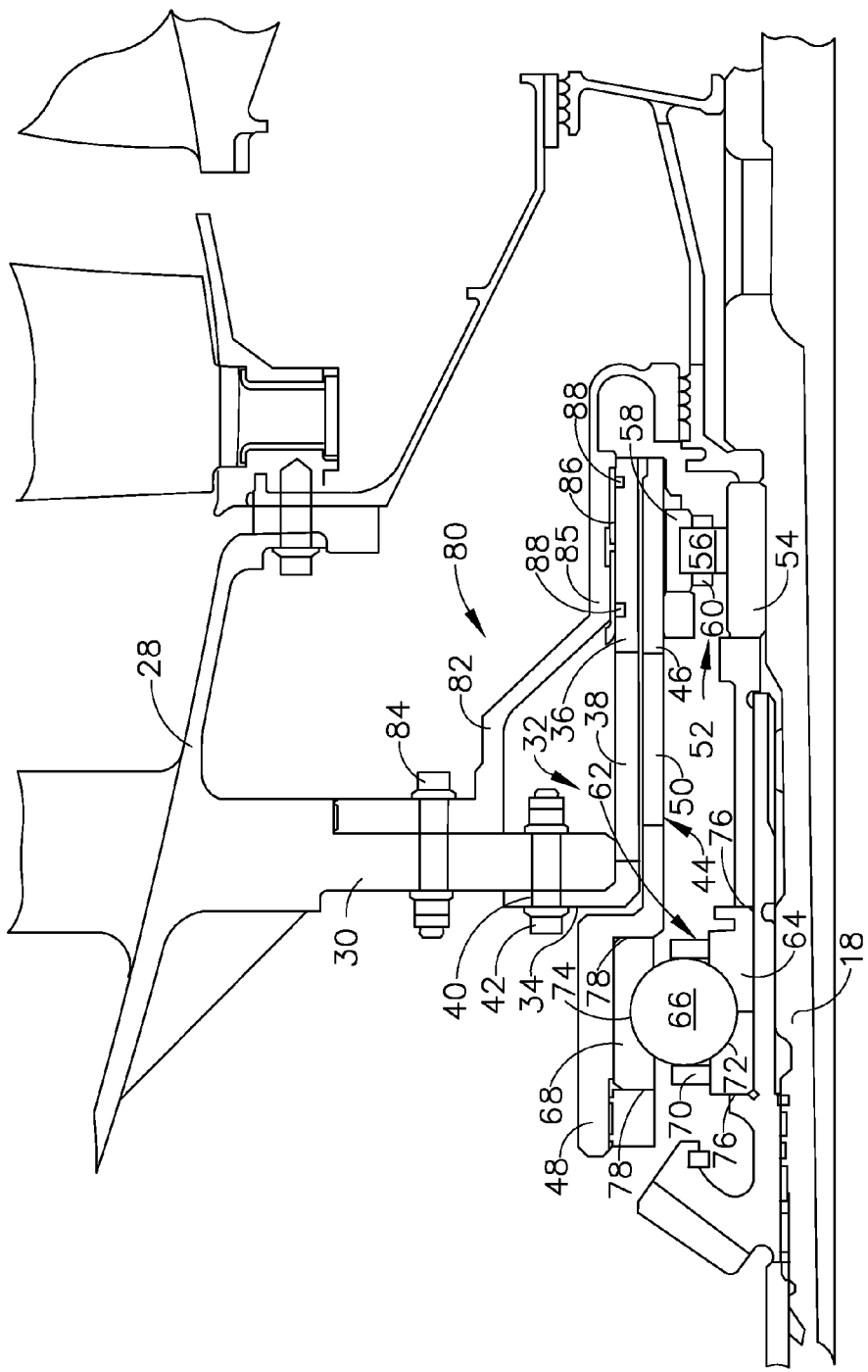
FIG. 2 is an enlarged view of a portion of the gas turbine engine of FIG. 1, showing the bearing support apparatus.

The inner and outer shafts 18 and 26 are mounted for rotation in several rolling-element bearings. The bearings are located in enclosed portions of the engine 10 referred to as "sumps". FIG. 2 illustrates a portion of one sump of the engine shown in FIG. 1. The inner shaft 18 is surrounded by a stationary structural frame 28 having an annular flange 30 which extends radially inward.

Figure 6:
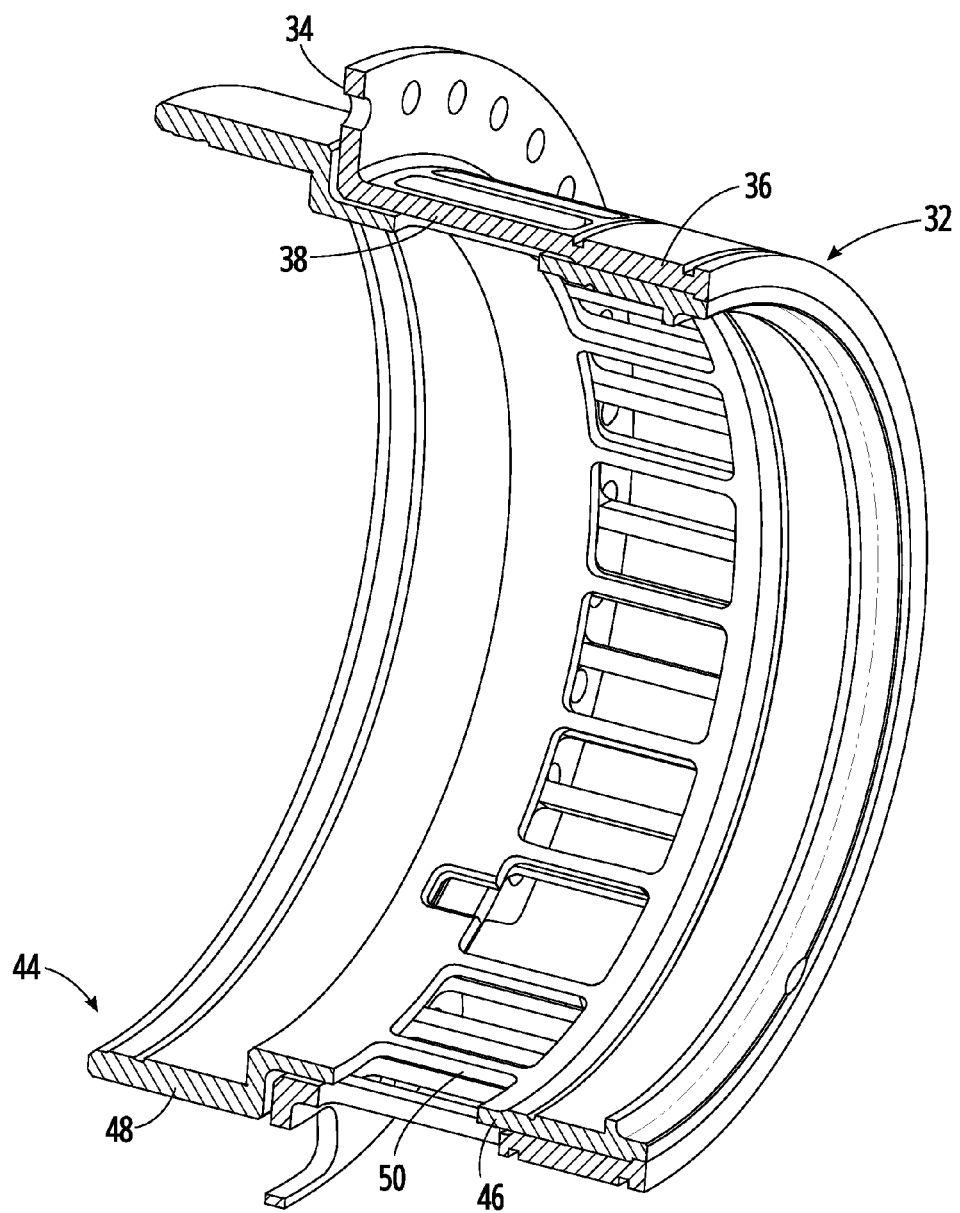
FIG. 6 is a perspective, sectioned view of a portion of the bearing support apparatus of FIG. 2.

A first bearing cage 32 is mounted to the flange 30. The first bearing cage 32 can be considered a spring support or a resilient support. The first bearing cage 32 comprises an annular forward ring 34, and an annular aft ring 36, interconnected by an annular array of spring arms 38 (seen in FIGS. 2 and 6). The spring arms 38 are configured to be essentially rigid against axial deflection of the aft ring 36 while permitting controlled radial deflection of the aft ring 36 relative to the forward ring 34. The number, shape, spacing, and dimensions of the spring arms 38 may be modified to suit a particular application, in particular to achieve a desired radial stiffness of the first bearing cage 32. As used herein the term "stiffness" refers to the force or unit load required per unit deflection. The aft ring 36 is generally cylindrical and extends axially in-line with the spring arms 38. The forward ring 34 extends the radial direction so as to define a mounting flange. The forward ring 34 includes a plurality of mounting holes 40 which receive fasteners 42 that secure the forward ring 34 to the flange 30 of the frame 28.

A second bearing cage 44 is mounted to the aft ring 36 of the first bearing cage 32. The second bearing cage 44 comprises an annular aft ring 46 received in the aft ring 36 of the first bearing cage 32, and an annular forward ring 48 positioned forward of the flange 30, interconnected by an annular array of spring arms 50 (seen in FIGS. 2 and 6). The second bearing cage 44 is secured to the to the first bearing cage 32 so that it will not move relative thereto. This may be accomplished, for example, by an interference fit, by the use of welding, radial pins, a mechanical joint, or other similar techniques. The spring arms 50 are configured to be essentially rigid against axial deflection of the forward ring 48 while permitting controlled radial deflection of the forward ring 48 relative to the aft ring 46. The number, shape, spacing and dimensions of the spring arms 50 may be modified to suit a particular application, in particular to achieve a desired radial stiffness of the second bearing cage 44. In some applications, the radial stiffness of the second bearing cage 44 may be selected to be significantly less than the first bearing cage 32.

A roller bearing 52 is disposed between the frame 28 and the inner shaft 18. The roller bearing 52 includes an annular inner race 54, a row of generally cylindrical rollers 56, an annular outer race 58, and a retainer 60. The inner race 54 of the roller bearing 52 is secured to the inner shaft 18 so that it will not rotate relative thereto, and the outer race 58 of the roller bearing 52 is secured to the aft ring 46 of the second bearing cage 44 so that it will not rotate relative thereto. The inherent configuration of the roller bearing 52 is such that axial loads cannot be transmitted through the roller bearing 52, other than minor forces transmitted by friction between the rollers 56 and the races 54 and 58.

A ball bearing 62 is disposed between the frame 28 and the inner shaft 18, axially forward of the roller bearing 52. The ball bearing 62 includes an annular inner race 64, a row of spherical balls 66, an annular outer race 68, and a retainer 70. The inner race 64 of the ball bearing 52 is secured to the inner shaft 18 so that it will not rotate relative thereto, and the outer race 68 of the ball bearing 62 is secured to the forward ring 48 of the second bearing cage 44 so that it will not rotate relative thereto. The inner race 64 defines a concave inner seat 72, and the outer race 68 defines a concave outer seat 74, both of which overlap the balls 66 in the radial direction. The inner race 64 abuts bearing surfaces 76 of the inner shaft 18 (or components mounted thereto) and the outer race abuts bearing surfaces 78 of the second bearing cage 44 (or components mounted thereon). This configuration permits axial loads (also referred to as thrust loads) to be transmitted from the inner shaft 18 through the ball bearing 62 and the first and second bearing cages 32 and 44 to the frame 28.

The bearing support apparatus includes an optional annular damper arm 80. The damper arm 80 has a forward portion 82 which is secured to the flange 30, for example using the illustrated bolts 84 or other suitable fasteners. The damper arm 80 extends radially inward and axially aft from the flange 30. An aft portion 85 of the damper arm 80 is generally cylindrical and is mounted in axial alignment and close radial proximity to the aft ring 36 of the first bearing cage 32.

Together the outer surface of the aft ring 36 and the inner surface of the aft portion 85 of the damper arm 80 define a thin annular squeeze film space 86 therebetween. A damper fluid such as an oil under pressure, is introduced into squeeze film space 86 through an appropriate conduit or inlet (not shown). In accordance with known principles, any rotor imbalance may cause the inner shaft 18 and the roller bearing 52 to undergo radial motion and subject oil in the squeeze film space 86 to very high pressure, thereby forcing viscous flow of the oil and a damping action on the roller bearing 52 and inner shaft 18. This action limits deflection of the aft ring 36 and the roller bearing 52. In order to seal damper oil in squeeze film space 86, the aft ring 36 includes a pair of spaced apart grooves 88 in its outer surface. A pair of sealing rings (not shown) may be fitted in the grooves 88 and adapted to engage the surface of the damper arm 80, thereby sealing the forward and aft boundaries of the squeeze film space 86.

In operation, the inner shaft 18 is subject to movement in the radial direction relative to the frame 28, causing radial deflections and loads in the components interconnecting the inner shaft 18 and the frame 28. The ball bearing 62 and the roller bearing 52 may be described as being supported by the frame 28 "in series" relative to radial loads. That is, the roller bearing 52 is mounted to the frame 28 through the first bearing cage 32, and the ball bearing 62 is mounted to the second bearing cage 44 which is mounted to the first bearing cage 32.

Because the second bearing cage 44 is a spring element, the radial compressive load applied to the ball bearing 62 has a known relationship to the relative radial deflection of the forward and aft rings 48 and 46 of the second bearing cage 44 (i.e., the radial load on the ball bearing 62 is proportional to the bending deflection of the spring arms 50). Considering a deflection of the inner shaft 18 towards the frame 28, the ball bearing 62 will experience radial load only if there is relative deflection between the ball bearing 62 and the roller bearing 52.

Given that the inner shaft 18 is a substantially rigid element, any radial deflection of the inner shaft 18 will generally result in equal deflection of the ball and roller bearings 62 and 52 with little to no bending of the spring arms 50.

Unequal deflection of the ball and roller bearings 62 and 52, or independent radial deflection of the ball bearing 62, may occur based on the presence of different radial clearances or preloads, or different radial baseline positions between the roller bearing 52 and the ball bearing 62.

However, once the limit of any independent radial ball bearing movement is reached, further radial deflection of the ball and roller bearings 62 and 52 will be in unison, with bending of the spring arms 38 of the first bearing cage 32. The radial deflection of the second bearing cage 44, and thus the radial load on the ball bearing 62 cannot increase further. In essence, the ball bearing 62 is isolated from all but a small, selected magnitude of the total radial deflection and radial loads that the bearing pair experiences in operation. In order to achieve maximum isolation of radial loads from the ball bearing 62, it is preferred that the spring arms 50 should have the lowest radial stiffness possible while still reliably transmitting axial loads. The total radial load on the ball bearing 62 may be set at an arbitrarily selected limit by manipulating the radial stiffness of the spring arms 50, and relative eccentricities of the rings 48 and 46. As an example, the total radial load may readily be limited to well under 0.4 kN (100 lbs.).

As described above, the ball bearing 62 and the roller bearing 52 are coaxial with each other in a static condition, or in other words the axis of rotation of each bearing coincides with axis of rotation of the other bearing. However, in some applications it may be desirable to provide a radial preload to the roller bearing 52 in order to prevent roller skidding. Therefore the ball bearing 62 can be laterally offset from the roller bearing 52. This may be accomplished, for example, by making the bore of the forward ring 48 of the second bearing cage 44 slightly eccentric from the bore of the aft ring 46 of the second bearing cage 44, or by offsetting the spring arms 50 so they do not extend exactly parallel to the longitudinal axis 11. Under the influence of thrust loads during engine operation, the ball bearing 62 will attempt to center the inner shaft 18 on its own rotational axis which will exert a limited radial force on the ball and roller bearings 62 and 52.

This technique is generally referred to as "offsetting" and is an effective means of guaranteeing that a minimum roller bearing load is present to prevent skidding. The present invention permits the bearings 62 and 52 to be offset from each other while maintaining the roller bearing 52 coaxial with the longitudinal axis of the engine 11. This is not possible with a prior art "parallel" bearing support configuration design because it would cause the roller bearing 52 to become uncentered within the oil film damper apparatus, decreasing the damping effectiveness. When offsetting is implemented the radial load on the ball bearing 62 will be greater than it would be without offsetting, however the radial load on the ball bearing may still be limited to a value well within the limit needed for adequate service reliability, for example the total radial load may be about 2 kN (500 lbs.) or less.

Figure 3:
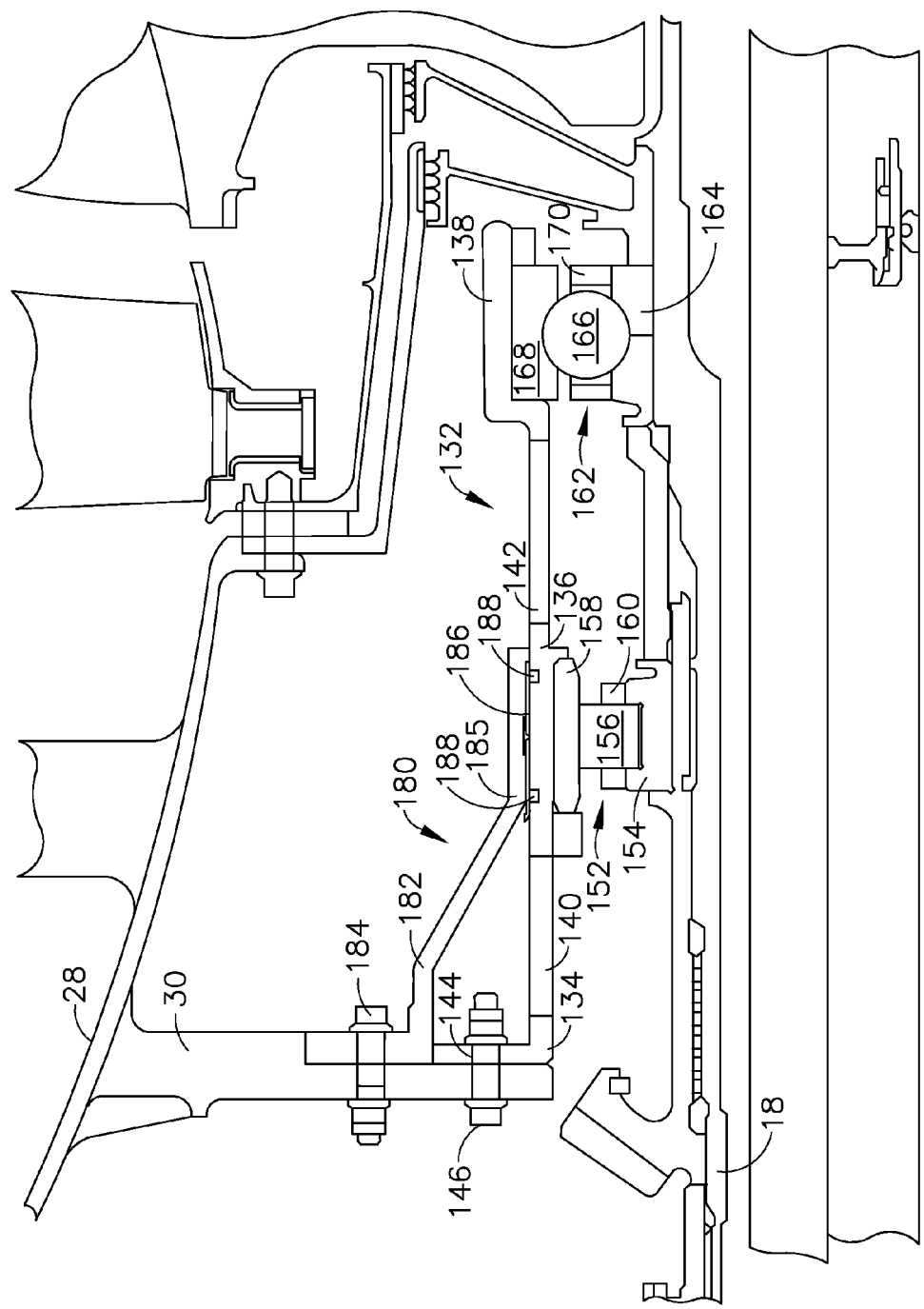
FIG. 3 is a half-sectional view of a portion of gas turbine engine, showing an alternative bearing support apparatus.

FIG. 3 illustrates an alternative bearing support apparatus for mounting bearings between a frame 28 having a flange 30 and an inner shaft 18. A bearing cage 132 is mounted to the flange 30. The bearing cage 132 can be considered a spring support or resilient support. The bearing cage 132 comprises an annular forward ring 134, an annular middle ring 136, and an annular aft ring 138. The forward ring 134 and the middle ring 136 are interconnected by an annular array of forward spring arms 140. The middle ring 136 and the aft ring 138 are interconnected by an annular array of aft spring arms 142.

The forward spring arms 140 are configured to be essentially rigid against axial deflection of the middle ring 136 while permitting controlled radial deflection of the middle ring 136 relative to the forward ring 134. The number, shape, spacing, and dimensions of the forward spring arms 140 may be modified to suit a particular application, in particular to achieve a desired radial stiffness.

The aft spring arms 142 are configured to be essentially rigid against axial deflection of the aft ring 138 while permitting controlled radial deflection of the aft ring 138 relative to the middle ring 136. The number, shape, spacing and dimensions of the aft spring arms 142 may be modified to suit a particular application, in particular to achieve a desired radial stiffness. In some applications the radial stiffness of the aft spring arms 142 may be selected to be significantly less than the radial stiffness of the forward spring arms 140.

The middle ring 136 and the aft ring 138 are each generally cylindrical and extend axially in-line with the spring arms 140 and 142. The forward ring 134 extends in the radial direction so as to define a mounting flange. The forward ring 134 also includes a plurality of mounting holes 144 which receive fasteners 146 that secure the forward ring 134 to the flange 30 of the frame 28.

A roller bearing 152 is disposed between the frame 28 and the inner shaft 18 and includes an annular inner race 154, a row of generally cylindrical rollers 156, an annular outer race 158, and a retainer 160. The inner race 154 is secured to the inner shaft 18 so that it will not rotate relative thereto, and the outer race 158 is secured to the middle ring 136 so that it will not rotate relative thereto.

A ball bearing 162 is disposed between the frame 28 and the inner shaft 18, axially aft of the roller bearing 152. The ball bearing 162 includes an annular inner race 164, a row of spherical balls 166, an annular outer race 168, and a retainer 170. The inner race 164 is secured to the inner shaft 18 so that it will not rotate relative thereto, and the outer race 168 is secured to the aft ring 138 so that it will not rotate relative thereto. The ball bearing 162 is configured as described above such that axial loads (also referred to as thrust loads) can be transmitted from the inner shaft 18 through the ball bearing 162 and the bearing cage 132 to the frame 28.

The bearing support apparatus includes an optional annular damper arm 180. The damper arm 180 has a forward portion 182 which is secured to the flange 30, for example using the illustrated bolts 184 or other suitable fasteners. The damper arm 180 extends radially inward and axially aft from the flange 30. An aft portion 185 of the damper arm 180 is generally cylindrical and is mounted in axial alignment and close radial proximity to the middle ring 136 of the first bearing cage 132.

Together the outer surface of the middle ring 136 and the inner surface of the aft portion 185 of the damper arm 180 define a thin annular squeeze film space 186 therebetween. A damper fluid such as an oil under pressure, is introduced into squeeze film space 186 through an appropriate conduit or inlet (not shown). In accordance with known principles, any rotor imbalance may cause the inner shaft 18 and the roller bearing 152 to undergo radial motion and subject oil in the squeeze film space 186 to very high pressure, thereby forcing viscous flow of the oil and a damping action on the roller bearing 152 and inner shaft 18. In order to seal damper oil in squeeze film space 186, the middle ring 36 includes a pair of spaced apart grooves 188 in its outer surface. A pair of sealing rings (not shown) may be fitted in the grooves 188 and adapted to engage the surface of the damper arm 180, thereby sealing the forward and aft boundaries of the squeeze film space 186.

The operation and performance of the bearing apparatus shown in FIG. 3 is substantially the same as described above, with the ball bearing 162 being isolated from all but minor radial deflections and loads by way of the series mounting arrangement provided by the bearing cage 132. The aft ring 138 may be offset relative to the middle ring 136 as described above to provide a desired radial load on the roller bearing 152.

Figure 4:
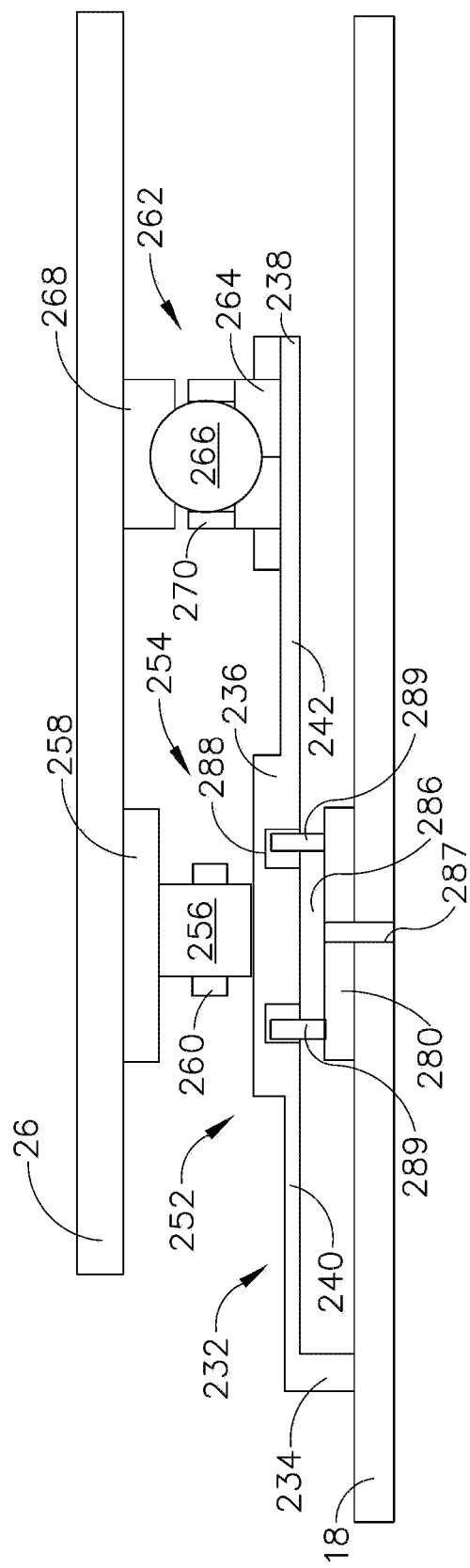
FIG. 4 is a half-sectional view of a portion of gas turbine engine, showing another alternative bearing support apparatus disposed between two shafts.

FIG. 4 illustrates another alternative bearing support apparatus. The apparatus is similar in operational principle to those described above, but differs in that it is configured for mounting bearings between two rotating shafts, for example the inner shaft 18 described above and the outer shaft 26. A bearing cage 232 is mounted to the inner shaft 18 so that it rotates with the inner shaft 18, for example by an interference fit. The bearing cage 232 can be considered a spring support or resilient support. The bearing cage 232 comprises an annular forward ring 234, an annular middle ring 236, and an annular aft ring 238. The forward ring 234 and the middle ring 236 are interconnected by an annular array of forward spring arms 240. The middle ring 236 and the aft ring 238 are interconnected by an annular array of aft spring arms 242.

The forward spring arms 240 are configured to be essentially rigid against axial deflection of the middle ring 236 while permitting controlled radial deflection of the middle ring 236 relative to the forward ring 234. The number, shape, spacing, and dimensions of the forward spring arms 240 may be modified to suit a particular application, in particular to achieve a desired radial stiffness.

The aft spring arms 242 are configured to be essentially rigid against axial deflection of the aft ring 238 while permitting controlled radial deflection of the aft ring 238 relative to the middle ring 236. The number, shape, spacing and dimensions of the aft spring arms 242 may be modified to suit a particular application, in particular to achieve a desired radial stiffness. In some applications the radial stiffness of the aft spring arms 242 may be selected to be significantly less than the radial stiffness of the forward spring arms 240.

The middle ring 236 and the aft ring 238 are each generally cylindrical and extend axially in-line with the spring arms 240 and 242. The forward ring 234 extends radially inward to engage the inner shaft 18.

A roller bearing 252 is disposed between the inner shaft 18 and the outer shaft 26 and includes an annular inner race 254, a row of generally cylindrical rollers 256, an annular outer race 258, and a retainer 260. The inner race 254 is integral with (or secured to) the middle ring 236 so that it will not rotate relative thereto, and the outer race 258 is secured to the outer shaft 26 so that it will not rotate relative thereto.

A ball bearing 262 is disposed between the inner shaft 18 and the outer shaft 26, axially aft of the roller bearing 252. The ball bearing 262 includes an annular inner race 264, a row of spherical balls 266, an annular outer race 268, and a retainer 270. The inner race 264 is secured to the aft ring 238 so that it will not rotate relative thereto, and the outer race 268 is secured to the outer shaft 26 so that it will not rotate relative thereto. The ball bearing 262 is configured as described above such that axial loads (also referred to as thrust loads) can be transmitted from the inner shaft 18 through the bearing cage 232 and the ball bearing 262 to the outer shaft 26.

The bearing support apparatus includes an optional annular damper ring 280. The damper ring 280 is generally cylindrical and is mounted to the inner shaft 18 in axial alignment and close radial proximity to the middle ring 236 of the bearing cage 232.

Together the inner surface of the middle ring 236 and the outer surface of the damper ring 280 define a thin annular squeeze film space 286 therebetween. A damper fluid such as an oil under pressure, is introduced into squeeze film space 286 through an appropriate conduit or inlet 287. In order to seal damper oil in squeeze film space 286, the middle ring 236 includes a pair of spaced apart grooves 288 in its outer surface. A pair of sealing rings 289 may be fitted in the grooves 288 and adapted to engage the surface of the damper ring 280.

The operation and performance of the bearing apparatus shown in FIG. 4 is substantially the same as described above, with the ball bearing 262 being isolated from all but minor radial deflections and loads by way of the series mounting arrangement provided by the bearing cage 232. The aft ring 238 may be offset relative to the middle ring 236 as described above to provide a desired radial load on the roller bearing 252.

Figure 5:
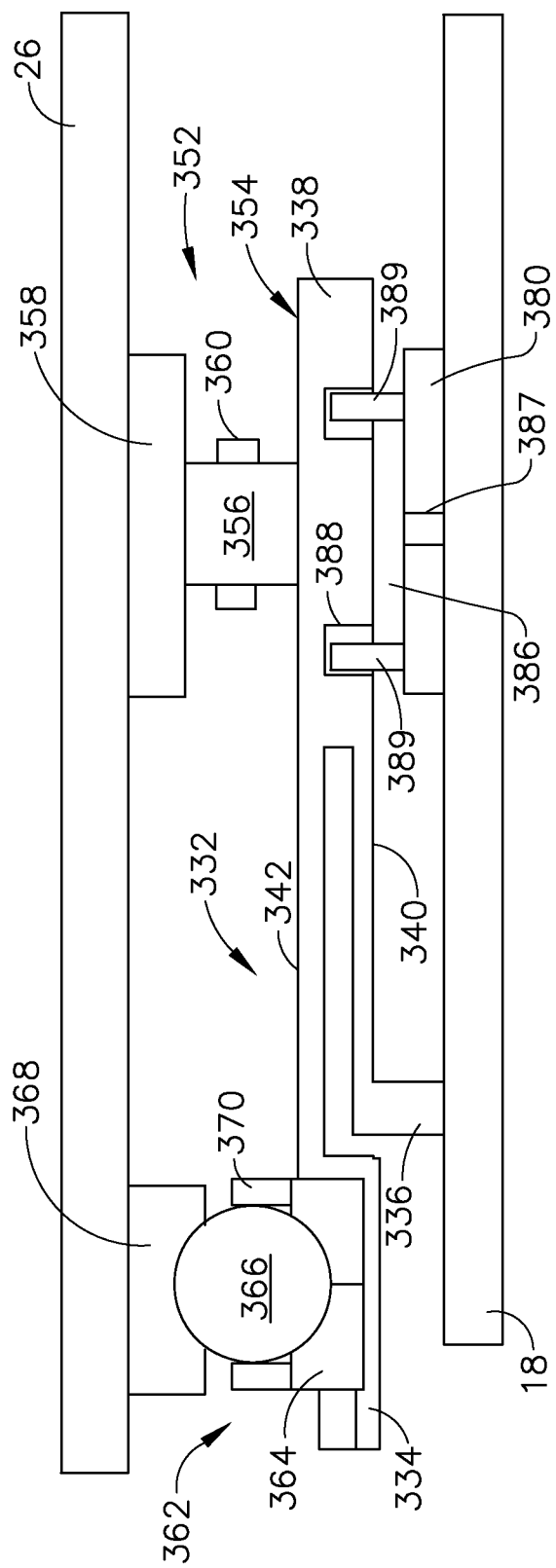
FIG. 5 is a half-sectional view of a portion of gas turbine engine, showing yet another alternative bearing support apparatus disposed between two shafts.

FIG. 5 illustrates another alternative bearing support apparatus that it is configured for mounting bearings between two rotating shafts, for example the inner shaft 18 described above and the outer shaft 26. The apparatus is similar in operational principle to the apparatus shown in FIG. 4, but differs in the arrangement in of the spring elements. A bearing cage 332 is mounted to the inner shaft 18 so that it rotates with the inner shaft 18, for example by an interference fit, and includes an annular forward ring 334, an annular middle ring 336, and an annular aft ring 338. The middle ring 336 and the aft ring 338 are interconnected by an annular array of inner spring arms 340. The forward ring 334 and the aft ring 338 are interconnected by an annular array of outer spring arms 342.

The inner spring arms 340 are configured to be essentially rigid against axial deflection of the aft ring 338 while permitting controlled radial deflection of the aft ring 338 relative to the middle ring 336. The number, shape, spacing, and dimensions of the inner spring arms 340 may be modified to suit a particular application, in particular to achieve a desired radial stiffness.

The outer spring arms 342 are configured to be essentially rigid against axial deflection of the forward ring 334 while permitting controlled radial deflection of the forward ring 334 relative to the aft ring 338. The number, shape, spacing and dimensions of the outer spring arms 342 may be modified to suit a particular application, in particular to achieve a desired radial stiffness. In some applications the radial stiffness of the outer spring arms 342 may be selected to be significantly less than the radial stiffness of the inner spring arms 340.

The forward ring 334 and the aft ring 338 are each generally cylindrical and extend axially parallel with the spring arms 340 and 342. The middle ring 336 extends radially inward to engage the inner shaft 18.

A roller bearing 352 is disposed between the inner shaft 18 and the outer shaft 26 and includes an annular inner race 354, a row of generally cylindrical rollers 356, an annular outer race 358, and a retainer 360. The inner race 354 is integral with (or secured to) the aft ring 338 so that it will not rotate relative thereto, and the outer race 358 is secured to the outer shaft 26 so that it will not rotate relative thereto.

A ball bearing 362 is disposed between the inner shaft 18 and the outer shaft 26, axially forward of the roller bearing 352. The ball bearing 362 includes an annular inner race 364, a row of spherical balls 366, an annular outer race 368, and a retainer 370. The inner race 364 is secured to the forward ring 334 so that it will not rotate relative thereto, and the outer race 368 is secured to the outer shaft 26 so that it will not rotate relative thereto. The ball bearing 362 is configured as described above such that axial loads (also referred to as thrust loads) can be transmitted from the inner shaft 18 through the bearing cage 332 and the ball bearing 362 to the outer shaft 26.

The bearing support apparatus includes an optional annular damper ring 380. The damper ring 380 is generally cylindrical and is mounted to the inner shaft 18 in axial alignment and close radial proximity to the aft ring 338 of the bearing cage 332.

Together the inner surface of the aft ring 338 and the outer surface of the damper ring 380 define a thin annular squeeze film space 386 therebetween. A damper fluid such as an oil under pressure, is introduced into squeeze film space 386 through an appropriate conduit or inlet 387. In order to seal damper oil in squeeze film space 386, the aft ring 338 includes a pair of spaced apart grooves 388 in its inner surface. A pair of sealing rings 389 may be fitted in the grooves 388 and adapted to engage the surface of the damper ring 380.

The operation and performance of the bearing apparatus shown in FIG. 5 is substantially the same as described above, with the ball bearing 362 being isolated from all but minor radial deflections and loads by way of the series mounting arrangement provided by the bearing cage 332. The forward ring 334 may be offset relative to the aft ring 338 as described above to provide a desired radial load on the roller bearing 352.

It is noted that generally any of the bearing races described herein may be made integral to one of the rings of the bearing cage supporting that bearing.

In comparison to prior art bearing supports, the apparatus described herein has the advantage of isolating a ball bearing from radial loads. This simplifies its design, allowing internal geometry to be optimized for pure thrust loading, and will result in longer life and improved reliability. At the same time, increasing the radial load on the adjacent roller bearing increases cage speed, and thereby decreases the risk of roller skidding damage. The present invention is also simpler and cheaper than prior art designs used to isolate ball bearings from radial loads.

The foregoing has described a bearing support apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A bearing support apparatus for a gas turbine engine, comprising:
 a first annular member;
 a second annular member disposed within the first annular member;
 first and second axially spaced-apart rolling-element bearings disposed between the first and second annular members so as to enable relative rotation of the first and second members;
 a first spring support connecting the first bearing to the first member; and
 a second spring support connecting the second bearing to the first member through the first spring support, such that the first and second bearings are physically supported in series relative to the first member.

2. The bearing support apparatus of claim 1 wherein the first bearing is a roller bearing.

3. The bearing support apparatus of claim 1 wherein the second bearing is a ball bearing.

4. The bearing support apparatus of claim 1 wherein the first bearing is laterally offset relative to the second bearing.

5. The bearing support apparatus of claim 1 wherein the second bearing is configured to transmit axial loads between the first and second members.

6. The bearing support apparatus of claim 1 wherein the first spring support comprises annular forward and aft rings interconnected by annular array of axially-extending spring fingers.

7. The bearing support apparatus of claim 1 wherein the second spring support comprises annular forward and aft rings interconnected by annular array of axially-extending spring fingers.

8. The bearing support apparatus of claim 1 wherein the first and second spring supports are arranged in an axially overlapping relationship.

9. The bearing support apparatus of claim 1 wherein the first and second spring elements are integral portions of a single member having annular forward, middle, and aft rings, the forward and middle rings being interconnected by annular array of axially-extending forward spring fingers and the middle and aft rings being interconnected by annular array of axially-extending aft spring fingers.

10. The bearing support apparatus of claim 1 further including a squeeze film damper disposed between the first member and one of the spring supports.

11. The bearing support apparatus of claim 1 wherein the first spring support has a first radial stiffness, and the second spring support has a second radial stiffness which is substantially less than the first radial stiffness.

12. The bearing support apparatus of claim 1 wherein the first and second spring supports are separate members which are mechanically coupled together.

13. The bearing support apparatus of claim 12 wherein the second member is a shaft mounted for rotation in the frame.

14. The bearing support apparatus of claim 1 wherein the first member is a stationary frame.

15. A bearing apparatus for a gas turbine engine, comprising:
 a stationary, annular frame;
 a first spring support comprising annular forward and aft rings interconnected by an annular array of axially-extending first spring fingers, wherein the forward ring is mounted to the frame;
 a second spring support comprising annular forward and aft rings interconnected by an annular array of axially-extending second spring fingers, the aft ring mounted to the aft ring of the first spring support;
 a roller bearing carried by the aft ring of the second spring support;
 a ball bearing carried by the forward ring of the second spring support; and
 a shaft mounted in the roller and ball bearings.

16. The bearing apparatus of claim 15 wherein the ball bearing is configured to transmit axial loads between the frame and the shaft.

17. The bearing apparatus of claim 15 wherein the first and second spring supports are arranged in an axially overlapping relationship.

18. The bearing support apparatus of claim 15 wherein the ball bearing is laterally offset relative to the roller bearing.

19. The bearing apparatus of claim 15 further including a squeeze film damper disposed between the frame and the first spring support.

20. The bearing apparatus of claim 15 wherein the first spring support has a first radial stiffness, and the second spring support has a second radial stiffness which is substantially less than the first radial stiffness.

* * * * *